(12) United States Patent
Bashir et al.

(10) Patent No.: US 12,199,809 B2
(45) Date of Patent: *Jan. 14, 2025

(54) METHOD AND SYSTEM FOR NETWORK FUNCTION MIGRATION PROCEDURES FOR A SIGNALING CONTROL PLANE

(71) Applicant: DISH Wireless L.L.C., Englewood, CO (US)

(72) Inventors: Kazi Bashir, Lewisville, TX (US); Mehdi Alasti, Reston, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,277

(22) Filed: Nov. 16, 2023

(65) Prior Publication Data

US 2024/0089164 A1 Mar. 14, 2024

Related U.S. Application Data

(63) Continuation of application No. 17/451,330, filed on Oct. 19, 2021, now Pat. No. 11,888,677.

(Continued)

(51) Int. Cl.
*H04L 41/0226* (2022.01)
*H04L 41/0816* (2022.01)
*H04W 48/18* (2009.01)

(52) U.S. Cl.
CPC ...... *H04L 41/0226* (2013.01); *H04L 41/0816* (2013.01); *H04W 48/18* (2013.01)

(58) Field of Classification Search
CPC ............ H04L 41/0226; H04L 41/0816; H04L 41/0897; H04W 48/18; H04W 24/02
See application file for complete search history.

(56) References Cited

U.S. PATENT DOCUMENTS 10,360,076 B1 7/2019 Burcham et al.
2017/0048314 A1 2/2017 Aerdts et al.
(Continued)

FOREIGN PATENT DOCUMENTS

EP 3737069 A1 11/2020
WO 2018121354 A1 7/2018

OTHER PUBLICATIONS

PCT International Search Report for International Application No. PCT/US2022/043665 dated Dec. 16, 2022 (4 pages).

(Continued)

*Primary Examiner* — Benjamin Lamont
(74) *Attorney, Agent, or Firm* — KW Law, LLP

(57) ABSTRACT

Systems and methods are provided to migrate a set of network functions between control planes of a network slice A and a network slice B; and a migration management unit to manage a gradual staged transfer of a subset of the plurality of network functions originally contained in the control plane of the network slice A to the control plane of network slice B wherein the gradual transfer is a migration of the plurality of network functions in a set of multiple stages to create the subset of the plurality of network functions in the control plane of slice B, wherein each gradual staged transfer includes the migration of a reduced subset of the plurality of network functions contained in the control plane of the network slice A reconfigured to the control plane of the network slice B.

20 Claims, 10 Drawing Sheets

Related U.S. Application Data

(60) Provisional application No. 63/261,265, filed on Sep. 16, 2021.

(56) References Cited

U.S. PATENT DOCUMENTS

| | | |
|---|---|---|
| 2017/0272523 A1 | 9/2017 | Cillis et al. |
| 2017/0371696 A1 | 12/2017 | Prziborowski et al. |
| 2018/0077023 A1 | 3/2018 | Zhang |
| 2018/0359795 A1 | 12/2018 | Baek et al. |
| 2021/0021647 A1 | 1/2021 | Cai et al. |
| 2021/0281983 A1 | 9/2021 | Gage |
| 2021/0342294 A1 | 11/2021 | Bhutani et al. |
| 2022/0408394 A1 | 12/2022 | Paczkowski |

OTHER PUBLICATIONS

Written Opinion of the International Searching Committee for International Application No. PCT/US2022/043665 dated Dec. 16, 2022 (7 pages).

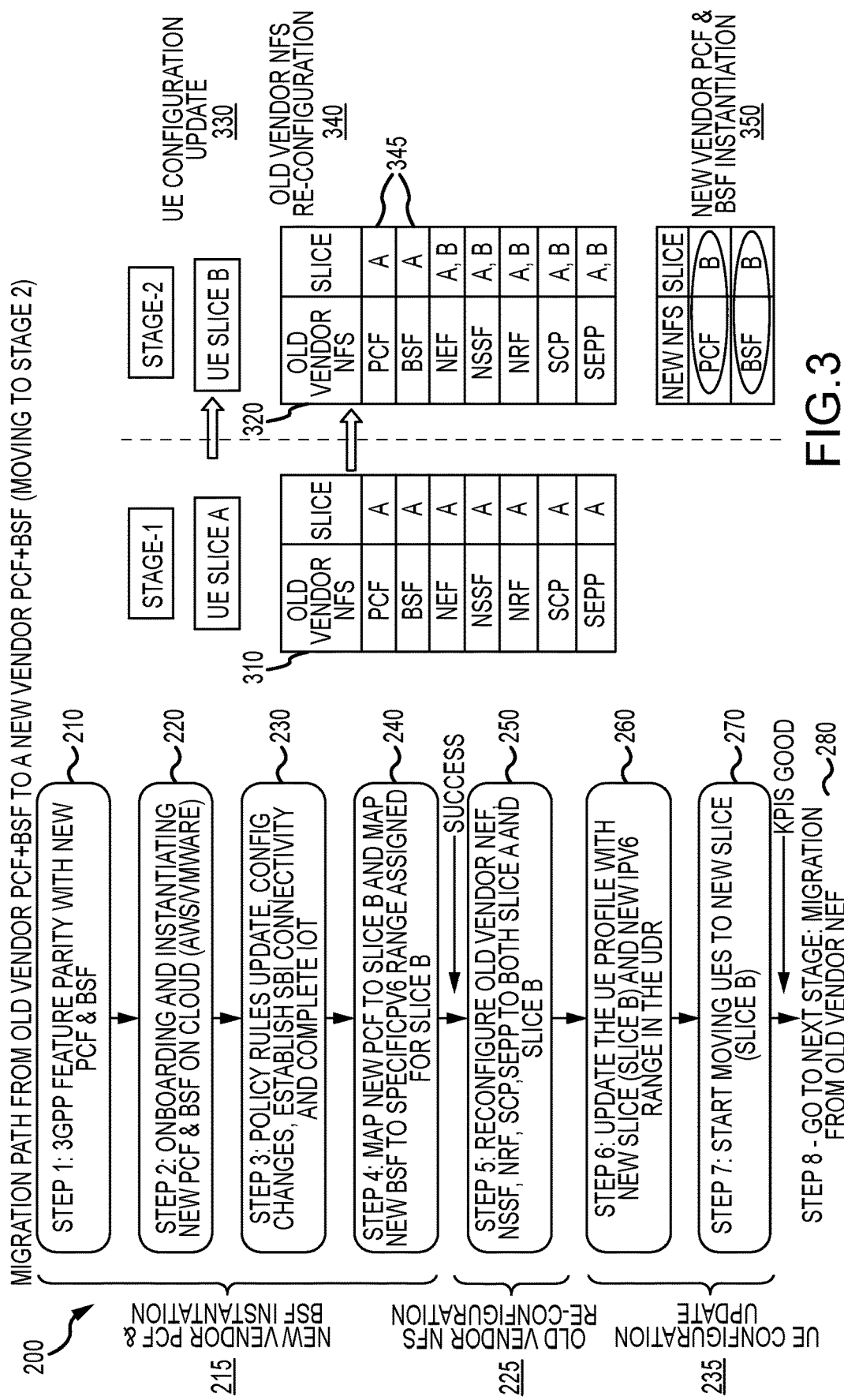

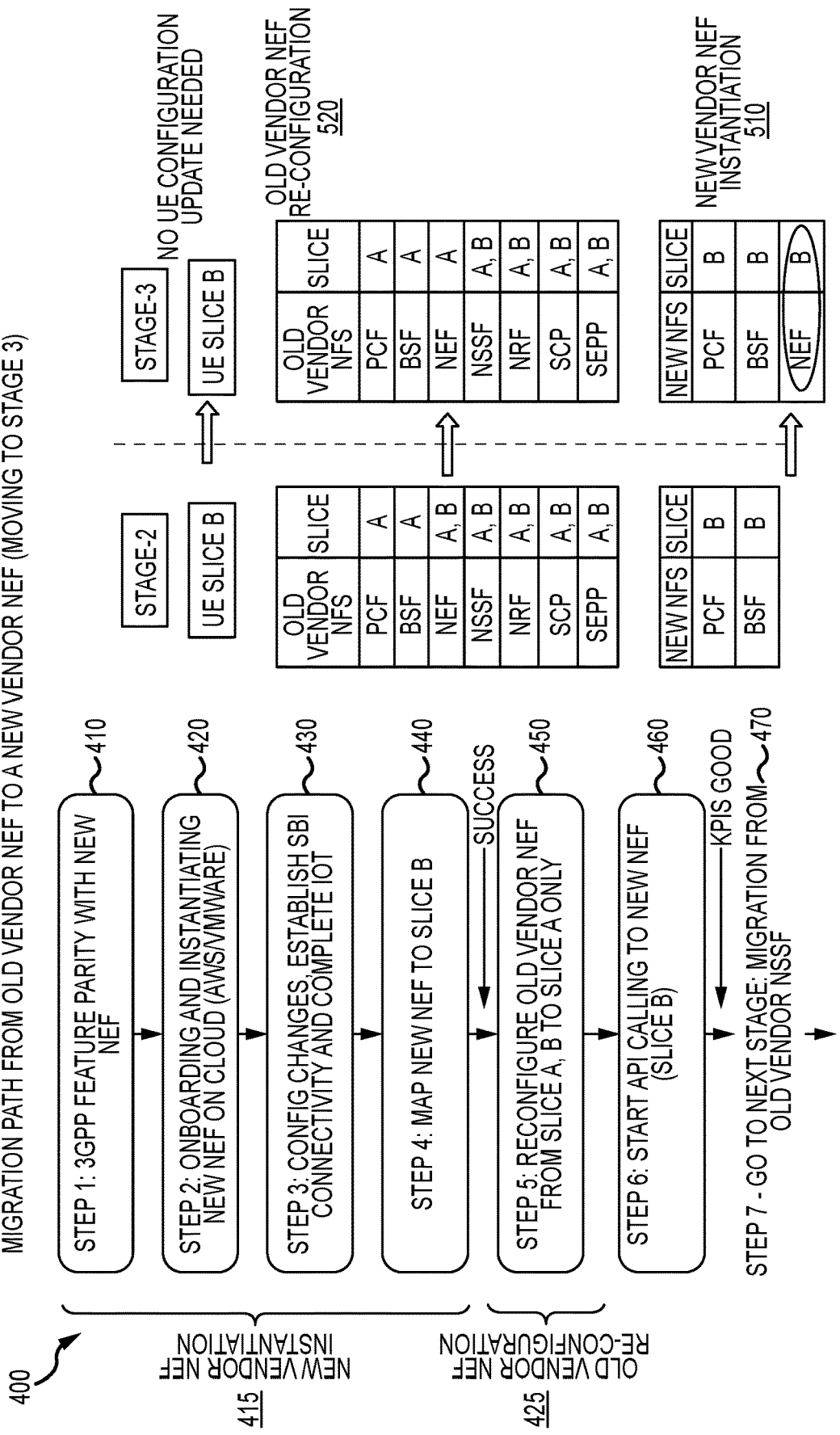

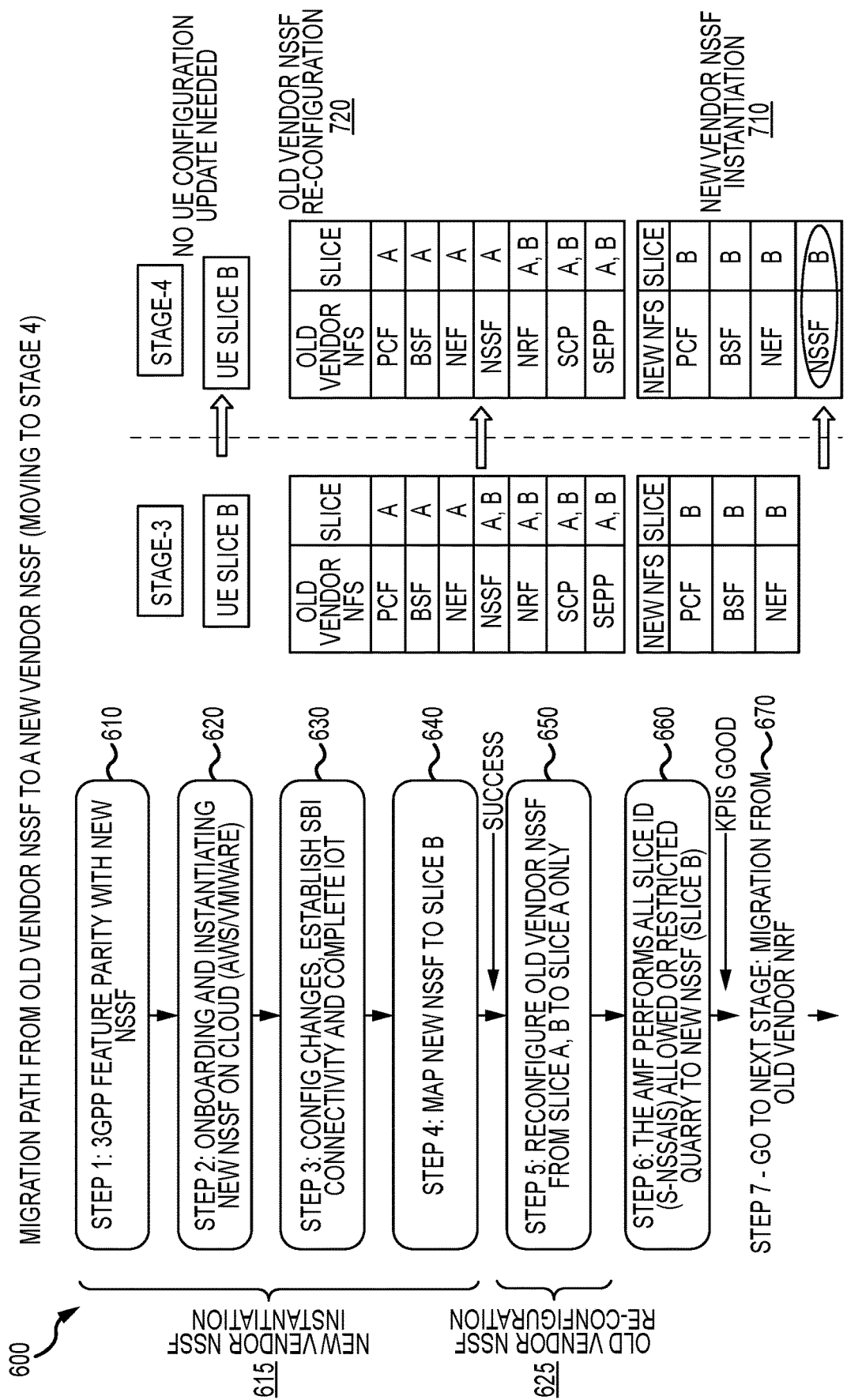

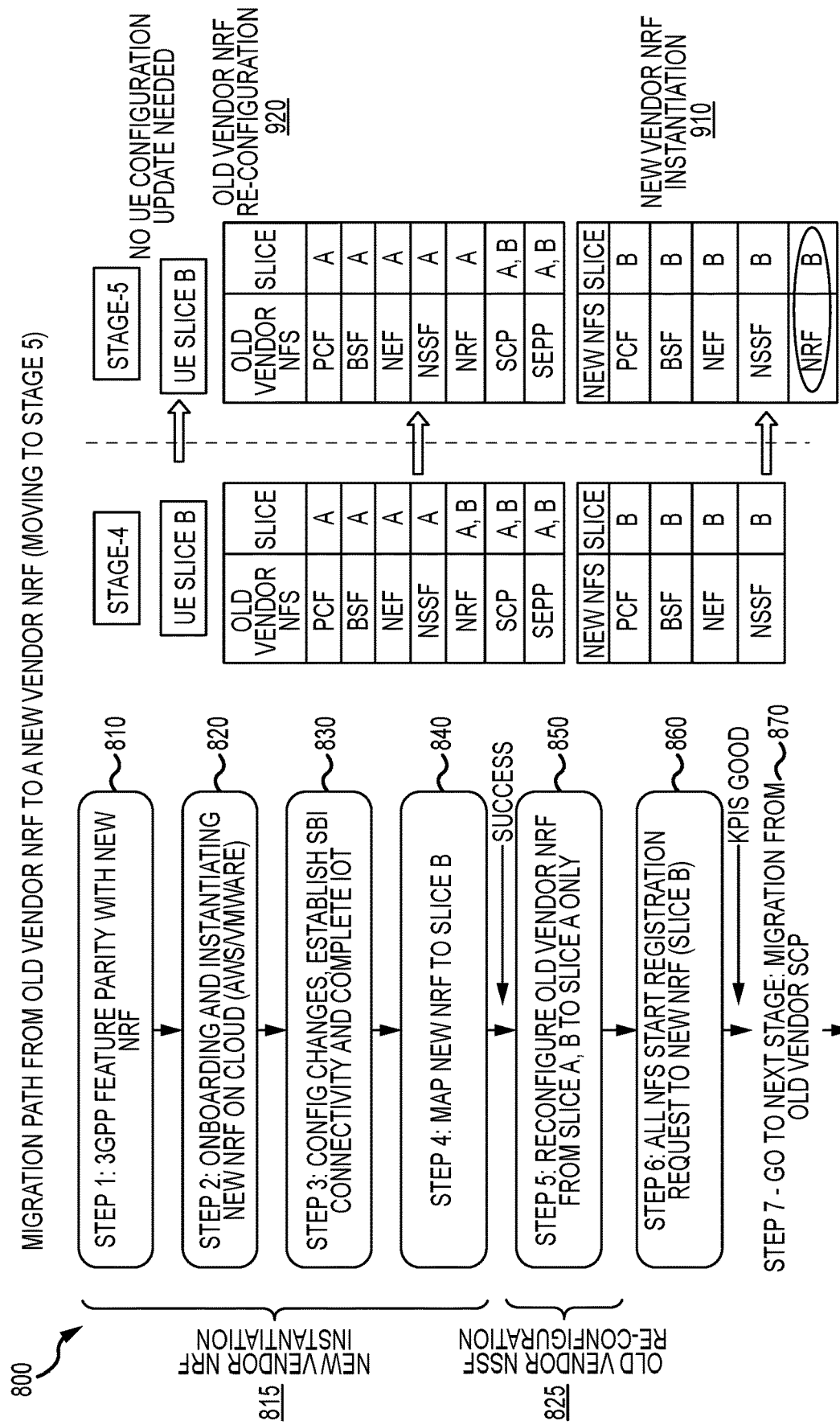

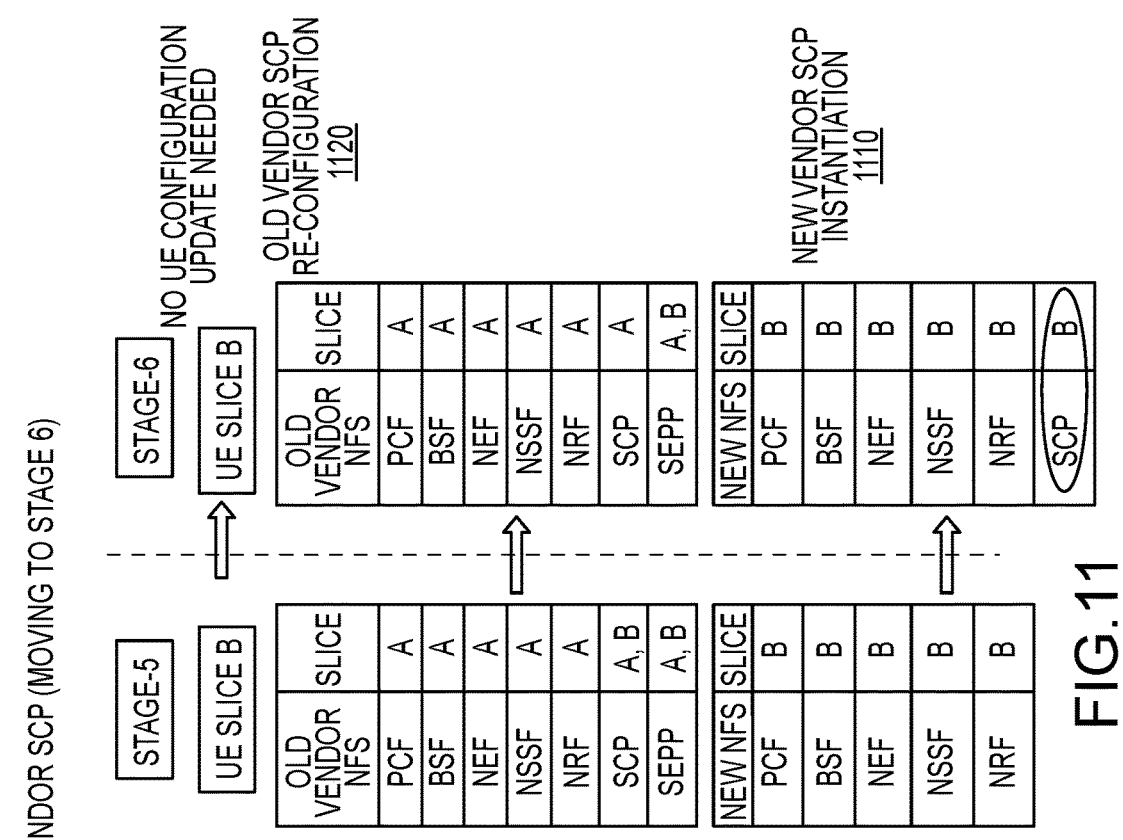
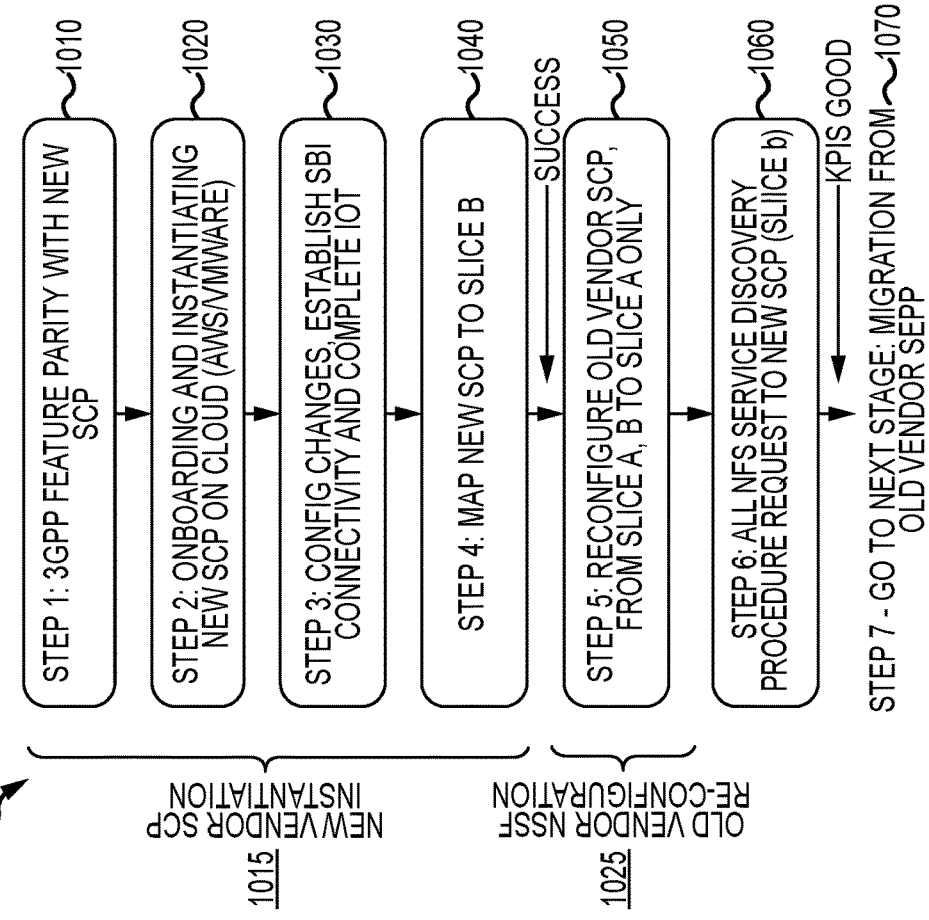
FIG. 10
FIG. 11

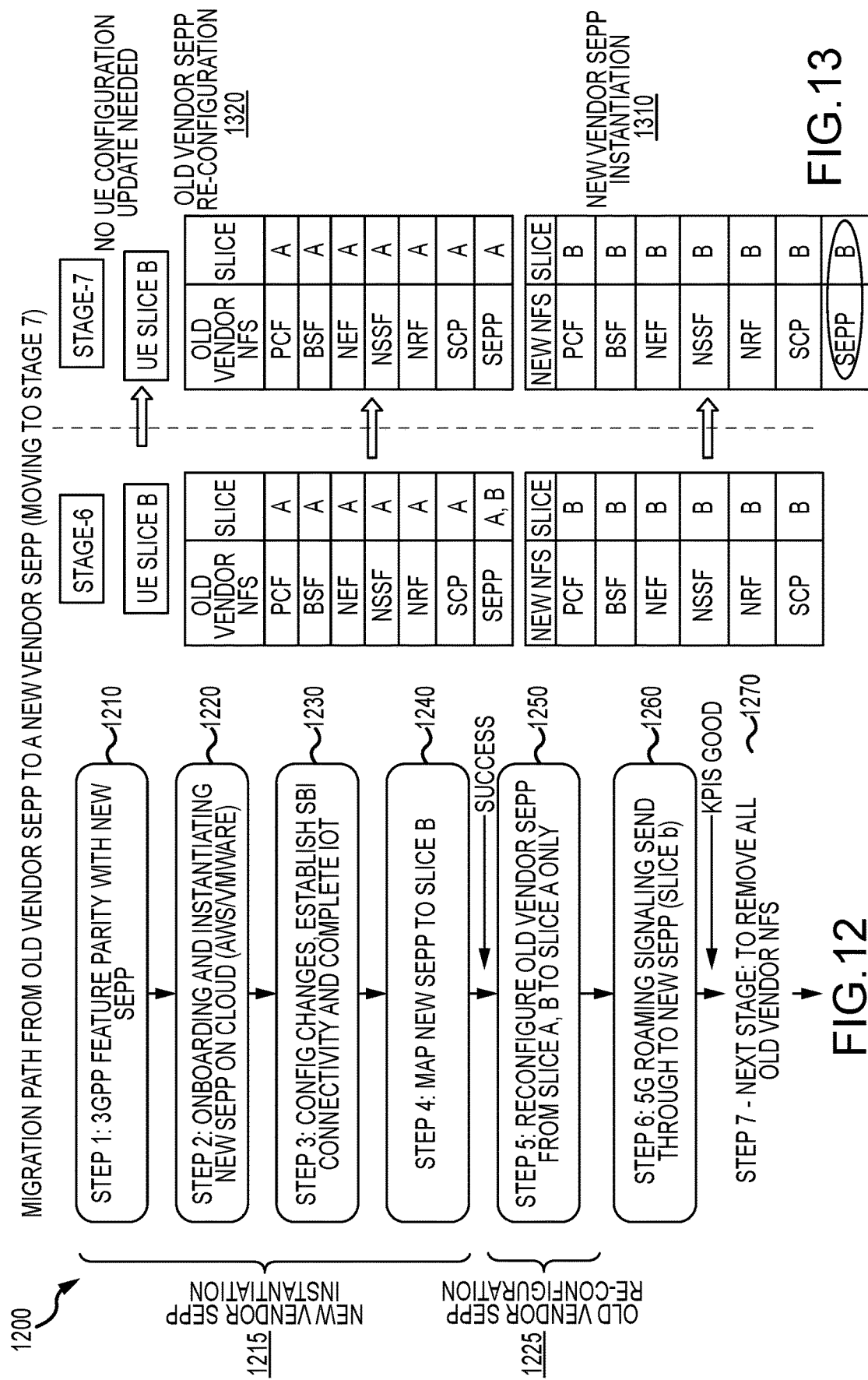

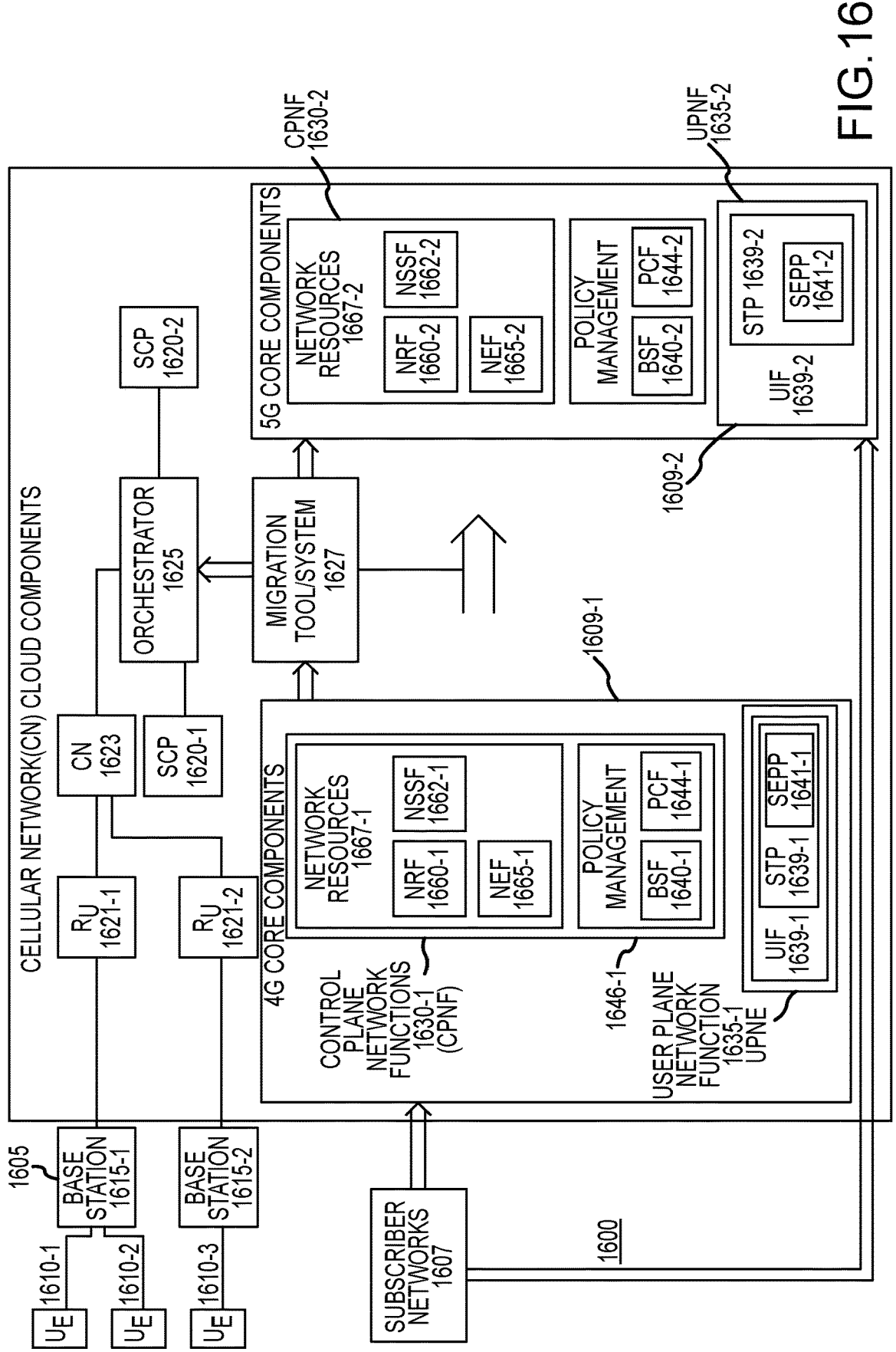

METHOD AND SYSTEM FOR NETWORK FUNCTION MIGRATION PROCEDURES FOR A SIGNALING CONTROL PLANE

CROSS-REFERENCE TO RELATED APPLICATIONS

This application is a continuation of U.S. patent application Ser. No. 17/451,330 filed on Oct. 19, 2021, which claims priority to U.S. Provisional Application Ser. No. 63/261,265 filed on Sep. 16, 2021, the contents of which are hereby incorporated by reference.

TECHNICAL FIELD

The following discussion generally relates to network function management in wireless communications systems. More particularly, the following discussion relates to systems, and processes for enabling the seamless migration of network functions of user equipment in a control plane of subscribers from a legacy vendor slice to a new vendor slice in a 5G core.

BACKGROUND

The 5G data standard and telephone networks were developed to provide greatly improved bandwidth and quality of service to mobile telephones, computers, internet-of-things (IoT) devices, and the like. The high-bandwidth 5G networks, however, face additional challenges that are now being recognized. The network migration roll-out of subscribers requires a gradual restructuring of service functions, and in actual implementation, has different requirements at different stages such as network planning, design, integration, and deployment. At the integration and deployment stage, for example, the major challenges are to integrate multiple vendors' software components and hardware into a stable and efficient system and to assign SLA agreements between different components.

It is desired to provide a solution to enable a seamless step by step migration process from previous vendor functions (NFs) at an original network slice to newer or different vendor functions (NFs) at another network slice in multiple stages with gradual transfers of NFs and UE profiles configurations in a manner that does not interrupt or impede connectivity of subscribers.

It is desired to provide an efficient application solution based on a limited subset of cloud based cellular functions and using a step by step algorithmic process for enabling imaged network functions of core components of a 5G legacy vendor slice transferred to a new 5G vendor slice for migrating subscribers from between 5G domain services.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein:

FIG. 2 illustrates a flow diagram of the migration from the legacy vendor of the network functions of the Policy Control Function (PCF) and Binding Support Function (BSF) to a new vendor with the network functions of the PCF and BSF in stage 2 of the NF migration management system in accordance with various exemplary embodiments;

FIG. 3 illustrates an exemplary set of comparisons of diagrams showing the migration from the legacy vendor of the network functions of the Policy Control Function (PCF) and Binding Support Function (BSF) in network slice A to a new vendor with the network functions of the PCF and BSF of network slice B in a migration step from stage 1 to stage 2 of the network function migration system in accordance with various exemplary embodiments;

FIG. 4 illustrates a flow diagram of the migration from an old or legacy vendor Network Exposure Function (NEF) of a set of Network Functions (NFs) configured to a new vendor NEF migration of stage 3 by the NF migration management system in accordance with various embodiments;

FIG. 5 illustrates a diagram of comparisons of functions in slices A, B from an old or legacy vendor Network Exposure Function (NEF) of a set of Network Functions (NFs) configured to a new vendor NEF migration of stage 3 by the NF migration management system in accordance with various embodiments;

FIG. 6 illustrates a flow diagram of the migration from an old or legacy vendor Network Slice Selection Function (NSSF) of a set of Network Functions (NFs) configured to a new vendor NSSF migration of stage 4 by the NF migration management system in accordance with various embodiments;

FIG. 7 illustrates a diagram of comparisons of functions in slices A, B from an old or legacy vendor Network Slice Selection Function (NSSF) of a set of Network Functions (NFs) configured to a new vendor NSSF migration of stage 4 by the NF migration management system in accordance with various embodiments;

FIG. 8 illustrates a flow diagram of the migration from an old or legacy vendor Network Repository Function (NRF) of a set of Network Functions (NFs) configured to a new vendor NRF migration of stage 5 by the NF migration management system in accordance with various embodiments;

FIG. 9 illustrates a diagram of comparisons of functions in slices A, B from an old or legacy vendor Network Repository Function (NRF) of a set of Network Functions (NFs) configured to a new vendor NRF migration of stage 5 by the NF migration management system in accordance with various embodiments;

FIG. 10 illustrates a flow diagram of the migration from an old or legacy vendor network Service Communication Proxy (SCP of a set of Network Functions (NFs) configured to a new vendor SCF migration of stage 6 by the NF migration management system in accordance with various embodiments;

FIG. 11 illustrates a diagram of comparisons of functions in slices A, B from an old or legacy vendor network Service Communication Proxy (SCP) of a set of Network Functions (NFs) configured to a new vendor SCP migration of stage 6 by the NF migration management system in accordance with various embodiments;

FIG. 12 illustrates a flow diagram of the migration from an old or legacy vendor network Security Edge Protection Proxy (SEPP) of a set of Network Functions (NFs) configured to a new vendor SEPP migration of stage 7 by the NF migration management system in accordance with various embodiments;

FIG. 13 illustrates a diagram of comparisons of functions in slices A, B from an old or legacy vendor network Security Edge Protection Proxy (SEPP) of a set of Network Functions (NFs) configured to a new vendor SEPP migration of stage 7 by the NF migration management system in accordance with various embodiments;

FIG. 16 illustrates an exemplary diagram of the network architecture for connectivity using NR radio access technologies in stages 1-8 of FIGS. 1-15 for the NF migration management system in accordance with various embodiments.

BRIEF SUMMARY

Figure 1:
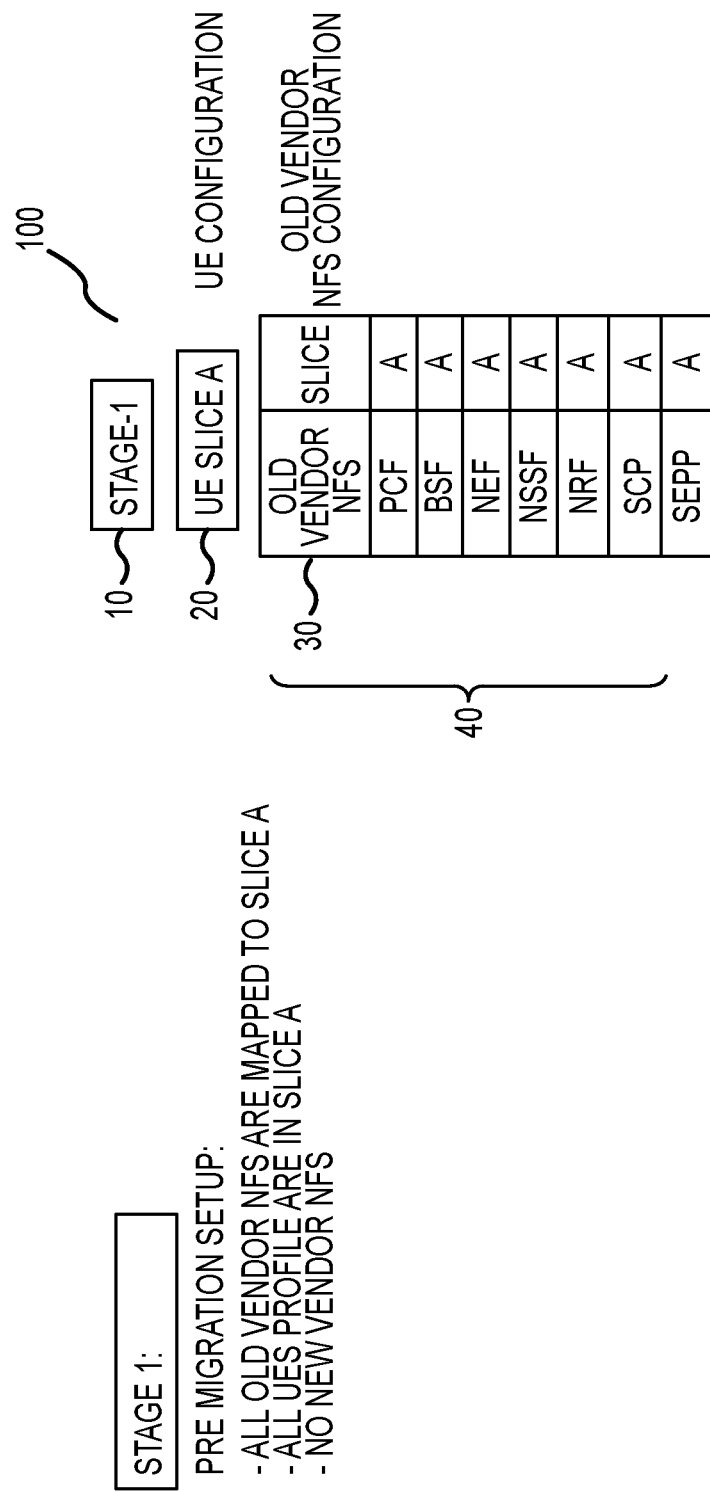
FIG. 1 is an exemplary diagram that lays out a static configuration of the pre-migration setup of the network functions that are mapped to the network slice A of the old or legacy vendor in a designated stage 1 of a set of gradual stage transfers (1-8) that enables the migration of a subset of the functions of the network by the NF migration management system in accordance with various exemplary embodiments.

Systems, devices, and automated processes are provided to enable sequential migration of network functions between old or legacy vendors and new vendors without disruption to end-users.

In an exemplary embodiment, a system to migrate a set of network functions between control planes of network slices is provided. The system includes a network slice A that includes a first set of a plurality of network functions in a control plane associated with a legacy vendor; a network slice B that includes a second set of the plurality of network functions in the control plane associated with a new vendor wherein the second set of the plurality of network functions includes a subset of the first set of the plurality of network functions in the control plane of network slice A; and a migration management unit to manage a gradual staged transfer of a subset of the plurality of network functions originally contained in the control plane of the network slice A to the control plane of network slice B wherein the gradual transfer is a migration of the plurality of network functions in a set of multiple stages to create the subset of the plurality of network functions in the control plane of slice B wherein each gradual staged transfer includes the migration of a reduced subset of the plurality of network functions contained in the control plane of the network slice A reconfigured to the control plane of the network slice B.

In at least one exemplary embodiment, the system includes the migration management unit to enable each gradual staged transfer of network functions of a mapping of the reduced subset of the plurality of network functions contained in the control plane of network slice A to the control plane of the network slice B.

In at least one exemplary embodiment, the system includes the migration management unit to enable each gradual staged transfer of the plurality of network functions by a seamless migration of the plurality of network functions in the control plane of the network slice A to the control plane of the network slice B without interruption of operation of user equipment.

In at least one exemplary embodiment, the system includes the network slice A is originally configured in a pre-migration setup that includes a plurality of previously mapped network functions mapped to the control of network slice A wherein the network slice A includes a set of a plurality of User Equipment (UE) profiles.

In at least one exemplary embodiment, the system includes the migration management unit to onboard and instantiate the subset of the plurality of network functions in the control plane of the network slice B from the control plane of the network slice A without impeding operations of the plurality of network functions received by the connected user equipment.

In at least one exemplary embodiment, the system includes the migration management unit to enable the migration of the plurality of network functions prioritized for user equipment of a set of premium users whereby the user equipment for the premium users is given higher prioritized access to the control plane of the network slice B than the user equipment for non-premium users via a priority scheme.

In at least one exemplary embodiment, the system includes wherein the set of the plurality of network functions at least includes Policy Control Functions (PCFs), Binding Support Functions (BSFs), Network Exposure Functions (NEFs), Network Slice Selection Functions (NSSFs), Service Communications Proxy (SCP), NF Repository Function (NRF), and Security Edge Protection Proxy (SEPP).

In at least one exemplary embodiment, the system includes in response to each gradual staged transfer of the plurality of network functions, the migration management unit configured to locate part of the subset of the plurality of network functions in the control plane of the network slice B while the plurality of network functions is operationally maintained on the network slice A until completion of the gradual staged transfer of the plurality of network functions to the networks slice B.

In at least one exemplary embodiment, the system includes the migration management unit configured to terminate functionalities of the plurality of network functions contained in the network slice A upon completion of the migration of the subset of the plurality of network functions and instantiation of the subset of the plurality of network functions contained in the control plane of the network slice B.

In another exemplary embodiment, a method for a gradual migration of network functions between network slices is provided. The method includes associating, by a migration management unit, a first set of a plurality of network functions in a control plane of a network slice A for a legacy vendor; configuring, by the migration management unit, a second set of the plurality of network functions in the control plane of a network slice B for a new vendor wherein the second set of the plurality of network functions includes a subset of the first set of the plurality of network functions in the control plane of network slice A; and managing, by the migration management unit, a multi-stage transfer of subsets of the plurality of network functions that are originally contained in the control plane of the network slice A to the control plane of network slice B wherein the multi-stage transfer includes a gradual migration of the plurality of network functions by multiple transfer stages of network function subsets to configure the plurality of network functions in the control plane of slice B wherein each stage of the multi-stage transfer includes a migration of reduced sets of the plurality of network functions contained in the control plane of the network slice A reconfigured for use on the control plane of the network slice B.

In at least one exemplary embodiment, the method includes mapping, by the migration management unit, each reduced set of the plurality of network functions contained in the control plane of the network slice A to the control plane of the network slice B.

In at least one exemplary embodiment, the method includes transferring, by the migration management unit, the plurality of network functions by the migration of multiple reduced sets of the plurality of network functions in the control plane of the network slice A to the control plane of the network slice B without interruption of communication of user equipment.

In at least one exemplary embodiment, the method includes configuring, by the migration management unit in a pre-migration setup, a plurality of previously implemented network functions mapped to the control of network slice A wherein the network slice A is configured with a set of profiles coupled to the user equipment.

In at least one exemplary embodiment, the method includes onboarding and instantiating by the migration management unit, each reduced set of the plurality of network functions migrated to the control plane of the network slice B from the control plane of the network slice A without interfering with communications from operations of connected user equipment, and functionalities ongoing of the plurality of network functions received in either network plane.

In at least one exemplary embodiment, the method includes prioritizing by the migration management unit, the plurality of network functions in a priority sequence of reduced sets of the plurality of network functions that are to be transferred between network slice A and network slice B.

In at least one exemplary embodiment, the method includes wherein the plurality of network functions at least includes Policy Control Functions (PCFs), Binding Support Functions (BSFs), Network Exposure Functions (NEFs), Network Slice Selection Functions (NSSFs), Service Communications Proxy (SCP), and Security Edge Protection Proxy (SEPP).

In at least one exemplary embodiment, the method includes in response to each gradual staged transfer of the plurality of network functions, the migration management unit is configured to locate part of the subset of the plurality of network functions in the control plane of the network slice B while an original set of network functions is operationally maintained on the network slice A until completion of the gradual staged transfer of the plurality of network functions to the networks slice B.

In yet another exemplary embodiment, a computer program product tangibly embodied in a computer-readable storage device that stores a set of instructions that when executed by a processor performs a method to migrate a set of network functions between control planes of network slices is provided. The method includes determining, by a migration management unit, a first set of a plurality of network functions in a control plane of a network slice A for a legacy vendor; configuring, by the migration management unit, a second set of the plurality of network functions in the control plane of a network slice B for a new vendor wherein the second set of the plurality of network functions includes a subset of the first set of the plurality of network functions in the control plane of network slice A; and managing, by the migration management unit, a multi-stage transfer of subsets of the plurality of network functions that are originally contained in the control plane of the network slice A to the control plane of network slice B wherein the multi-stage transfer includes a gradual migration of the plurality of network functions by multiple transfer stages of network function subsets to configure the plurality of network functions in the control plane of slice B wherein each stage of the multi-stage transfer includes a migration of reduced sets of the plurality of network functions contained in the control plane of the network slice A reconfigured for use on the control plane of the network slice B.

In at least one exemplary embodiment, the method includes mapping, by the processor, each reduced set of the plurality of network functions contained in the control plane of the network slice A to the control plane of the network slice B.

In at least one exemplary embodiment, the method includes onboarding and instantiating by the processor, each reduced set of the plurality of network functions migrated to the control plane of the network slice B from the control plane of the network slice A without interfering with communications from operations of connected user equipment, and functionalities ongoing of the plurality of network functions configured in either network plane.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

The virtualization of the radio access network (RAN) of next-generation (5G) wireless systems enables applications and services to be physically decoupled from devices and network infrastructure. This enables the dynamic deployment of different services by different network operators over the same physical infrastructure. RAN slicing utilizes virtualization for the 5G core and the present disclosure describes using virtualization with the slicing for the 5G core for the migration from a legacy/old vendor NFs to new vendor NFs.

Cloud-native is an architecture where services are segmented into smaller or microservices for deploying and reusing in third-party data centers, or a multitenant cloud platform. Cloud-native is the moving of premise-based applications to a server-based model where the servers are provided by third parties. The result is a cloud-based application without significant changes in the application for cloud enablement. This migration to the cloud approach can be used for legacy-based applications that are to be hosted in the cloud. Deployment of a cloud-native 5G network, includes an O-RAN architecture-based radio access network and a 5G core network. At the same time, OSS and BSS systems will also be deployed on the third-party cloud.

Cloud-native is an architecture where services are segmented into smaller or microservices for deploying and reusing in third-party data centers, or a multitenant cloud platform. Cloud-native is the moving of premise-based applications to a server-based model where the servers are provided by third parties. The result is a cloud-based application without significant changes in the application for cloud enablement. This migration to the cloud approach can be used for legacy-based applications that are to be hosted in the cloud. Deployment of a cloud-native 5G network, includes an O-RAN architecture-based radio access network and a 5G core network. At the same time, OSS and BSS systems will also be deployed on the third-party cloud.

In embodiments, Network slicing enables creating multiple virtual networks on a common physical infrastructure that guarantees an agreed SLA for specific functionality requested from different service providers or tenants. Each slice provides complete network functionality including radio access network functions, and core network (CN) functions.

Network slicing is part of the Next Generation Mobile Network (NGMN) alliance and standardized by the 3GPP enabling it to be integrated into the ETSI-NFV architecture. The NFV standards define the interaction between the network slice management functions defined by the 3GPP and the NFV Management and Orchestration (MANO) module, and establishes the required connection between the network controllers and the NFV orchestration unit to perform the dynamic assignment of network resources.

The network slicing in 5G shares a physical network's resources to multiple virtual networks. The network slices are regarded as a set of virtualized networks on the top of a physical network. The network slices can be allocated to specific applications/services, use cases, or business models to meet their requirements. Each network slice can be operated independently with its virtual resources, topology, data traffic flow, management policies, and protocols. Network slicing requires implementation in an end-to-end manner to support the co-existence of heterogeneous systems. The Virtual Private Network (VPN) is virtualized and divided up into multiple building blocks called Virtualized Network Functions (VNFs). The VNFs are chained together and build Service Function Chains (SFC) to deliver a required network functionality. The network slicing architecture contains access slices (both radio access and fixed access), core network (CN) slices, and the selection function that connects these slices into a complete network slice that includes both the access network and the CN. The selection function routes communications to an appropriate CN slice that is tailored to provide specific services. The criteria of defining the access slices and CN slices include the need to meet different service/applications requirements and to meet different communication requirements. Each CN slice is built from a set of network functions (NFs). In embodiments, some NFs in network slices can be used across multiple slices, while other NFs are tailored to a specific slice. The NFV Infrastructure (NFVI) provides an infrastructure with both physical and virtual resources to deploy, manage, and execute VNFs. The hardware resources in the infrastructure can include computing, storage, and network are abstracted by Virtualization Layer to provide processing, storage, and connectivity to VNFs with independent lifecycles.

In exemplary embodiments, the 5G RAN architecture includes CU, DU, and RU units that can be imaged and implemented in software in a development platform. In embodiments, the CU and DU units can be virtualized and deployed centrally, and RUs can be deployed at various sites. The virtualization of the 5G core network and access network enables the deployment of the network function software end-to-end on a third-party cloud infrastructure.

In exemplary embodiments, the 5G core network is divided into the control plane (CP) and the user plane (UP) handled by the user plane function (UPF). The CP can be centrally deployed in large areas, and UPF can be distributed in various regions or within an enterprise. The new code built-in branches in cloud-native app development include marrying microservices, cloud platforms, containers, KUBENETES®, immutable infrastructure, declarative APIs, and runtime deployment services with techniques like DevOps and agile methodology.

FIG. 1 is a diagram 100 that lays out a static configuration of the pre-migration setup of the network functions 40 that are mapped to the network slice A "20" of the old or legacy vendor 30 in a designated stage one 10 of a set of gradual stage transfers (one to eight) that enables the migration of a subset of the functions of the network to be gradually migrated by a migration management unit to a network slice B. The list of network functions for slice A of the legacy vendor are sequentially listed for migration in a sequence of policy and charging control functions (PCFs), Binding Support Functions (BSFs), Network Exposure Functions (NEFs), Network Slice Selection Functions (NSSFs), Service Communications Proxy (SCP), and Security Edge Protection Proxy (SEPP). In this instance, there are no new network functions not contained or mapped to network slice A of the legacy or old vendor 30. Hence, in the pre-migration set up of network slice A "20", the old vendor network functions 40 are mapped in their entirety in network slice A.

FIG. 2 illustrates a flow diagram of the migration from the legacy vendor of the network functions of the Policy Control Function (PCF) and Binding Support Function (BSF) to a new vendor with the network functions of the PCF and BSF in stage 2 of the network function migration system in accordance with various exemplary embodiments. In FIG. 2, flow chart 200 illustrates an exemplary process of network function migration system mapping the PCF and BSF network functions from slice A to slice B from stage 1 to stage 2 steps of the multi-stage migration process. The flow process illustrated in FIG. 2 includes three parts of the first part 215 for the instantiation of the new vendor PCF and BSF network functions, the second part 225 of the legacy vendor reconfiguration of the network functions, and the third part 235 of the user equipment (UE) updating. The first part 215 of stage 1 to stage 2 process includes the multiple steps as follows: Step 1 of defining the 3 rd Generation Partnership Projection (3GPP) feature parity 210 with the new PCF and BSF functions. Step 2 of onboarding and instantiating 220 the new PCF and BSF network functions on various cloud networks (e.g., AMAZON® Web Services (AWS), VMWARE® Cloud). Step 3 of actions 230 of policy rule updates, configuring changes, and establishing SBI connectivity and complete (JOT). Step 4 of mapping 240 new PCF functions to the network slice B and mapping new BSF functions to specific IPv6 ranges assigned for the network slice B. Upon the successful completion of the first part 215, the next or second part 225 commences of step 5 of reconfiguring 250 the legacy vendor network functions NEF, NSSF, NRF, SCP, SEPP to both network slice A and network slice B.

Next, the third part 235 of the UE configuration update takes place and includes step 6 of updating 260 the UE profile with the new network slice B and the new IPv6 range (as well as IPv4) in the UDR. Also, step 7 starts or initiates moving 270 the UEs to the new network slice B offering. Once the key performance indicators (KPIs) are validated for the configuration of the network functions in network slice B, the next set of network function migration takes place (i.e., in this case, step 8 of the next stage of migration from the legacy vendor of the NEF function).

FIG. 3 illustrates an exemplary set of comparisons of diagrams showing the migration from the legacy vendor of the network functions of the Policy Control Function (PCF)

and Binding Support Function (BSF) in network slice A to a new vendor with the network functions of the PCF and BSF of network slice B in a migration step from stage 1 to stage 2 of the network function migration system in accordance with various exemplary embodiments. In FIG. 3, the legacy or old vendor NFs 310 in Slice A are migrated to Slices A, B where Slice B is configured at 350 with the new vendor PCF and BSF instantiation (Step 1), Slice A contains the old vendor NFs 320 reconfiguration (Step 2) at 340 of the PCF and BSF network functions PCF and BSF at 345, and the UE configuration is updated at 330 (step 3) at slice B. Once steps 1 to 3 are completed, the network functions PCF and BSF are virtualized by software implementations of network functions deployed from network slice A to network slice B. This includes the network functions virtualization infrastructure (NFVI) which is the totality of all hardware and software components that build the environment where NFVs are deployed.

FIG. 4 illustrates a flow diagram of the migration from an old or legacy vendor Network Exposure Function (NEF) of a set of Network Functions (NFs) configured to a new vendor NEF migration of stage 3 by the NF migration management system in accordance with various embodiments. The NEF is one of the capabilities that is natively built into the 5G network, Applications can subscribe to certain changes in the network and command the network to exploit its programmable capabilities providing new innovative services for the end-users. The NEF function provides a means to securely expose the services and capabilities provided by 3GPP network functions.

In flow diagram 400, a similar cycle is repeated for instantiation of the NEF network function from slice A to slice B. Here, in the first stage 415 for new vendor instantiation, similar steps are repeated to the network function instantiation in slice B and include at step 1 (440), the 3GPP feature parity with the new NEF is determined by a network slice controller (i.e., a network function migration tool) that orchestrates the migration of the NEF function between slices. At 420, in step 2, the onboarding and instantiating of the new NEF occur on the chosen cloud network. At 430, step 2 the configuration changes are implemented and service-based interface (SBI) connectivity is established, and the IOT is completed. At 440, step 4, the new NEF is mapped to Slice B. In the second stage 425, for the old vendor re-configuration, at 450, step 5 the old vendor NEF is reconfigured from slice A, B to slice A only. At 460, step 6 the start API calls the new NEF in slice B. If the KPIs are determined to be good for the instantiation of the NEF in slice B, then the flow proceeds to migrate the old vendor NSSF to slice B.

FIG. 5 illustrates a diagram of comparisons of functions in slices A, B from an old or legacy vendor Network Exposure Function (NEF) of a set of Network Functions (NFs) configured to a new vendor NEF migration of stage 3 by the NF migration management system in accordance with various embodiments. In FIG. 5, at step 1 (510), the new vendor NEF instantiation in the control plane of Slice B takes place. At step 2 (520), the old vendor NEF reconfiguration in the control plane of Slice B occurs. Further, no UE configuration updates are required.

FIG. 6 illustrates a flow diagram of the migration from an old or legacy vendor Network Slice Selection Function (NSSF) of a set of Network Functions (NFs) configured to a new vendor NSSF migration of stage 4 by the NF migration management system in accordance with various embodiments. The NSSF Network Exposure Network Slice Selection Function is a functional element that enables the Access and Mobility Management Function (AMF) to perform initial registration and PDU session establishment.

In flow diagram 600, a similar cycle is repeated for instantiation of the NEF network function from slice A to slice B. Here, in the first stage (Step 1) 615 for new vendor instantiation, similar steps are repeated to the network function instantiation in slice B and include at step 1 (610), the 3GPP feature parity with the new NSSF is determined by a network slice controller (i.e., a network function migration tool) that orchestrates the migration of the NSSF function between slices. At 620, in step 2, the onboarding and instantiating of the new NSSF occur on the chosen cloud network. At 630, step 2 the configuration changes are implemented and service-based interface (SBI) connectivity is established, and the IOT is completed. At 640, step 4, the new NSSF is mapped to Slice B. In the second stage (Step 2) 625, for the old vendor re-configuration, at 650, step 5 the old vendor NSSF is reconfigured from slice A, B to slice A only. At 660, step 6 the AMF performs all slice ID (S-NSSAIs) allowed restricted quarry to new NSSF (Slice B). If the KPIs are determined to be good for the instantiation of the NSSF in slice B, then the flow proceeds to migrate the old vendor NRF to slice B.

FIG. 7 illustrates a diagram of comparisons of functions in slices A, B from an old or legacy vendor Network Slice Selection Function (NSSF) of a set of Network Functions (NFs) configured to a new vendor NSSF migration of stage 4 by the NF migration management system in accordance with various embodiments. In FIG. 7, at step 1 (710), the new vendor NSSF instantiation in the control plane of Slice B takes place. At step 2 (720), the old vendor NSSF reconfiguration in the control plane of Slice B occurs. Further, no UE configuration updates are required.

FIG. 8 illustrates a flow diagram of the migration from an old or legacy vendor Network Repository Function (NRF) of a set of Network Functions (NFs) configured to a new vendor NRF migration of stage 5 by the NF migration management system in accordance with various embodiments. The NRF Network Exposure Function Network Slice Selection Function in the Service-Based Architecture employs a centralized discovery framework that leverages an NF Repository Function (NRF). The NRF maintains a record of available NF instances and their supported services. It allows other NF instances to subscribe and be notified of registrations from NF instances of a given type. The NRF supports service discovery, by receipt of Discovery Requests from NF instances and details which NF instances support specific services.

In flow diagram 800, a similar cycle is repeated for instantiation of the NRF network function from slice A to slice B. Here, in the first stage (Step 1) 815 for new vendor instantiation, similar steps are repeated to the network function instantiation in slice B and include at step 1 (810), the 3GPP feature parity with the new NRF is determined by a network slice controller (i.e., a network function migration tool) that orchestrates the migration of the NRF function between slices. At 820, in step 2, the onboarding and instantiating of the new NRF occur on the chosen cloud network. At 830, step 2 the configuration changes are implemented and service-based interface (SBI) connectivity is established, and the IOT is completed. At 840, step 4, the new NRF is mapped to Slice B. In the second stage (Step 2) 825, for the old vendor re-configuration, at 850, step 5 the old vendor NRF is reconfigured from slice A, B to slice A only. At 860, step 6, all NFs start registration requests to the new NRF (Slice B). If the KPIs are determined to be good for the instantiation of the NRF in slice B, then the flow proceeds to migrate the old vendor SCP to slice B.

FIG. 9 illustrates a diagram of comparisons of functions in slices A, B from an old or legacy vendor Network Repository Function (NRF) of a set of Network Functions (NFs) configured to a new vendor NRF migration of stage 5 by the NF migration management system in accordance with various embodiments. In FIG. 9, at step 1 (910), the new vendor NRF instantiation in the control plane of Slice B takes place. At step 2 (920), the old vendor NRF reconfiguration in the control plane of Slice B occurs. Further, no UE configuration updates are required.

FIG. 10 illustrates a flow diagram of the migration from an old or legacy vendor network Service Communication Proxy (SCF) of a set of Network Functions (NFs) configured to a new vendor SCF migration of stage 6 by the NF migration management system in accordance with various embodiments. The Service Communication Proxy (SCF) provides a single point of entry for a cluster of network functions once they have been successfully discovered by the NRF. This allows the SCP to become the delegated discovery point in a data center, offloading the NRF from the numerous distributed services meshes that would ultimately make up a network operator's infrastructure. Together with the NRF, the SCP forms the hierarchical 5G Service Mesh.

In flow diagram 1000, a similar cycle is repeated for instantiation of the SCF network function from slice A to slice B. Here, in the first stage (Step 1) 1015 for new vendor instantiation, similar steps are repeated to the network function instantiation in slice B and include at step 1 (1010), the 3GPP feature parity with the new SCF is determined by a network slice controller (i.e., a network function migration tool) that orchestrates the migration of the SCF function between slices. At 1020, in step 2, the onboarding and instantiating of the new SCF occur on the chosen cloud network. At 1030, step 2 the configuration changes are implemented and service-based interface (SBI) connectivity is established, and the IOT is completed. At 1040, step 4, the new SCF is mapped to Slice B. In the second stage (Step 2) 1025, for the old vendor re-configuration, at 1050, step 5 the old vendor SCF is reconfigured from slice A, B to slice A only. At 1060, step 6, all NFs service discover procedure requests to the new SCF (Slice B). If the KPIs are determined to be good for the instantiation of the SCF in slice B, then the flow proceeds to migrate the old vendor SEPP to slice B.

FIG. 11 illustrates a diagram of comparisons of functions in slices A, B from an old or legacy vendor network Service Communication Proxy (SCP) of a set of Network Functions (NFs) configured to a new vendor SCP migration of stage 6 by the NF migration management system in accordance with various embodiments. In FIG. 11, at step 1 (1110), the new vendor SCP instantiation in the control plane of Slice B takes place. At step 2 (1120), the old vendor SCP reconfiguration in the control plane of Slice B occurs. Further, no UE configuration updates are required.

FIG. 12 illustrates a flow diagram of the migration from an old or legacy vendor network Security Edge Protection Proxy (SEPP) of a set of Network Functions (NFs) configured to a new vendor SEPP migration of stage 7 by the NF migration management system in accordance with various embodiments. The Security Edge Protection Proxy (SEPP) enables secure interconnect between 5G networks. The SEPP ensures end-to-end confidentiality and/or integrity between source and destination network for all 5G interconnect roaming messages. The N32-f is the Forwarding interface between the SEPPs, which is used for forwarding the communication between the Network Function (NF) service consumer and the NF service producer after applying for the application level security protection. The goal of roaming is to keep mobile users seamlessly connected to a network, wherever they are. This has been the case for each generation of wireless communication technology, but as operators launch their commercial 5G services, roaming is about to get more complex.

In flow diagram 1200, a similar cycle is repeated for instantiation of the SEPP network function from slice A to slice B. Here, in the first stage (Step 1) 1215 for new vendor instantiation, similar steps are repeated to the network function instantiation in slice B and include at step 1 (1210), the 3GPP feature parity with the new SEPP is determined by a network slice controller (i.e., a network function migration tool) that orchestrates the migration of the SEPP function between slices. At 1220, in step 2, the onboarding and instantiating of the new SCF occur on the chosen cloud network. At 1230, step 2 the configuration changes are implemented and service-based interface (SBI) connectivity is established, and the IOT is completed. At 1240, step 4, the new SEPP is mapped to Slice B. In the second stage (Step 2) 1225, for the old vendor re-configuration, at 1250, step 5 the old vendor SEPP is reconfigured from slice A, B to slice A only. At 1260, step 6, all NFs service discover procedure requests to the new SEPP (Slice B). If the KPIs are determined to be good for the instantiation of the SEPP in slice B, then the flow proceeds to remove all old vendor NFs.

FIG. 13 illustrates a diagram of comparisons of functions in slices A, B from an old or legacy vendor network Security Edge Protection Proxy (SEPP) of a set of Network Functions (NFs) configured to a new vendor SEPP migration of stage 7 by the NF migration management system in accordance with various embodiments. In FIG. 13, at step 1 (1310), the new vendor SEPP instantiation in the control plane of Slice B takes place. At step 2 (1320), the old vendor SEPP reconfiguration in the control plane of Slice B occurs. Further, no UE configuration updates are required.

Figure 14:
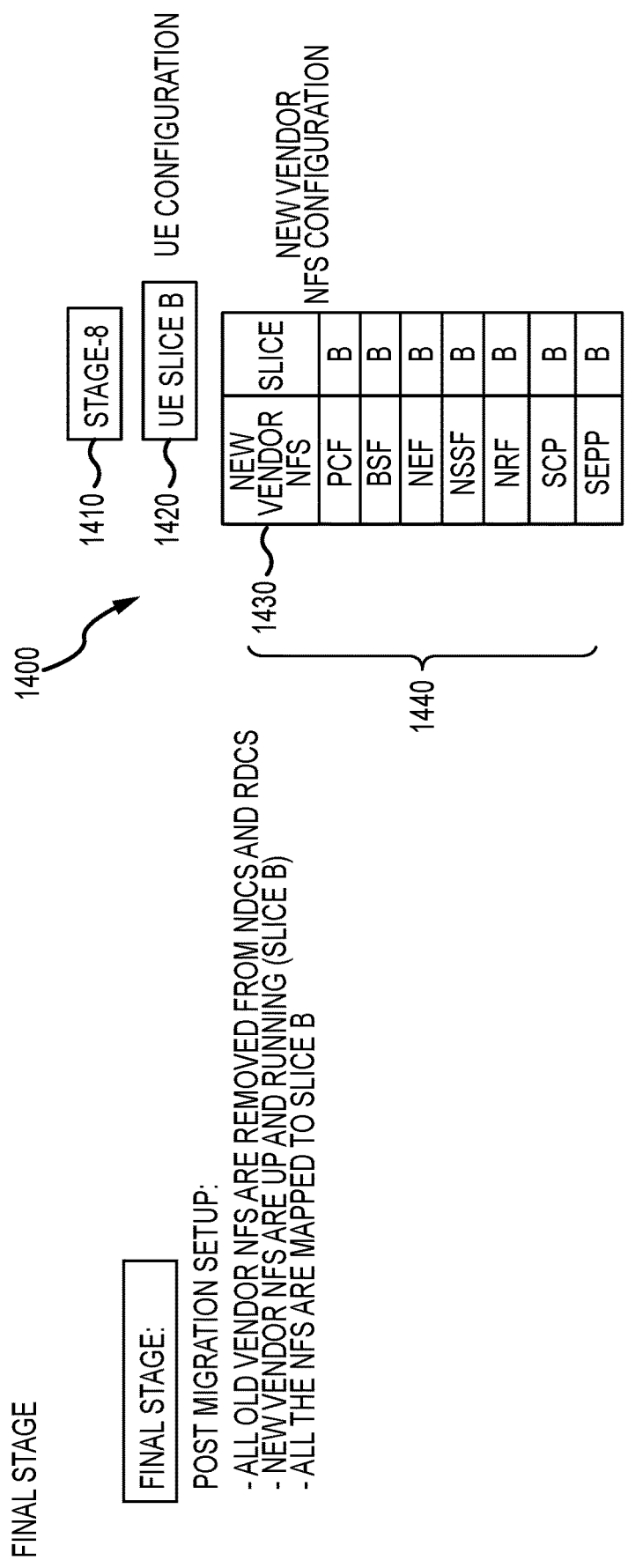
FIG. 14 illustrates an exemplary diagram that lays out a static configuration of the final migration setup of the network functions that are mapped to the network slice B of the new vendor in a designated stage 8 of a set of gradual stage transfers (1-8) that enables the migration of a subset of the functions of the network to be gradually migrated by the NF migration management system, in accordance with various embodiments.

FIG. 14 illustrates an exemplary diagram 1400 that lays out a static configuration of the final migration setup of the network functions 1440 that are mapped to the network slice B "1420" of the new vendor 1430 in a designated stage eight 1410 of a set of gradual stage transfers (one to eight) that enables the migration of a subset of the functions of the network to be gradually migrated by a migration management (orchestration) unit to a network slice B, in accordance with various embodiments. The list of network functions for slice B of the new vendor are sequentially listed for migration of the following: a sequence of Policy Control functions (PCFs), Binding Support Functions (BSFs), Network Exposure Functions (NEFs), Network Slice Selection Functions (NSSFs), Service Communications Proxy (SCP), and Security Edge Protection Proxy (SEPP). In this instance, there are no new network functions not contained or mapped to network slice B (from the original slice A) of the new vendor 1430. Hence, in the Final or post-migration set up of network UE slice B "1420", the new network functions 1440 are mapped (and substantiated) in their entirety in network slice B.

Figure 15:
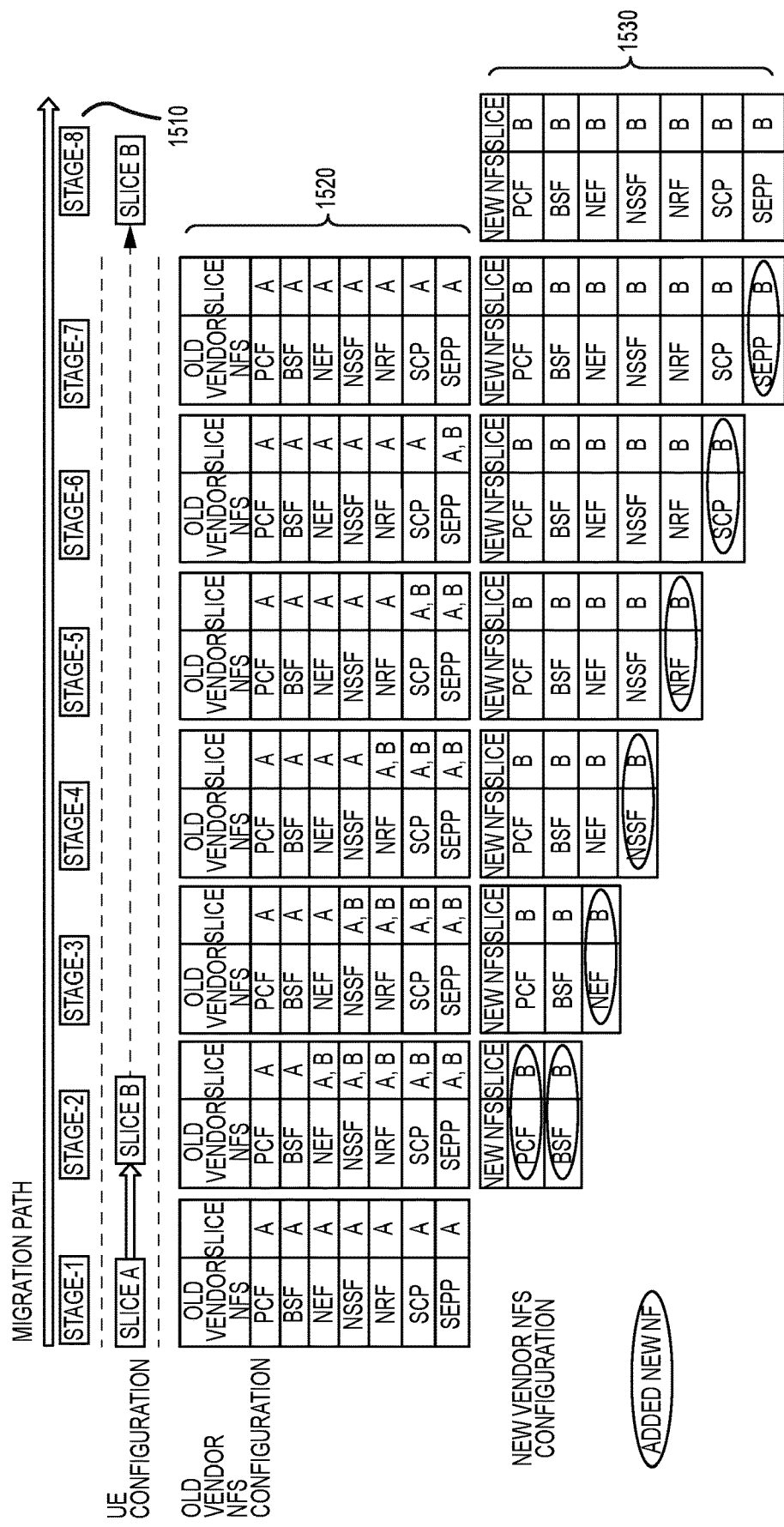
FIG. 15 illustrates an exemplary multistep diagram of the migration from an old or legacy vendor Network Functions (NFs) configured to a new vendor migration in stages 1-8 of FIGS. 1-14 by the NF migration management system in accordance with various embodiments.

FIG. 15 illustrates an exemplary multistep diagram of the migration from an old or legacy vendor Network Functions (NFs) configured to a new vendor migration in stages 1-8 by the NF migration management system in accordance with various embodiments.

FIG. 15 includes a set of stages 1-8 (1510) with UE configurations from slice A to Slice B, an old vendor NFs configuration in stages 1-7 (1520), and a new vendor NFs configuration in stages 2-8 (1530). The various stages and NFs migration were described in detail in FIGS. 1-14. FIG. 15 provides an overview of the set of NFs that are migrated in the control planes between both slices A, B.

FIG. 16 illustrates an exemplary diagram of the network architecture for connectivity using NR radio access technologies for the NF migration management system in accordance with various embodiments. Network slice supports the communication service of a particular connection type with a specific way of handling the Control Plane (CP) and User Plane (UP) for this service.

FIG. 16 illustrates an embodiment of a cellular network (CN) slice 1600 that includes a 5G Legacy Radio Cellular system ("5G Legacy System") where network functions are migrated to a 5G New Radio Cellular system ("5G System") in a cloud platform via a migration tool (i.e., network function migration system) in accordance with various embodiments. The 5G legacy/new 5G cellular system 1605 includes UEs (1610-1, 1610-2, 1610-3, 110-n) in communication via base stations (1615-1, 1615-2, etc) for a set of gNBs of the cellular network 1605 that include NR units. The UEs 1610-1, 1610-2, etc. are connected via interfaces RU 1621-1, 1621-2 to cloud-based cellular elements 1609-1, 1609-2 for legacy 5G/new 5G communications. For the 5G legacy domain, the cellular components include the user-plane network functions (UPNFs) 1635-1, and Control Plane Network Functions (CPNFs) 1630-1 of the 5G legacy service-based architecture. The UPNF 1635-1 includes the User plane function (UPF) 1637-1, includes a security edge protection proxy (SEPP) function 1641-1. Other user plane network functions can include data network (DN) functions. The CPNFs 1630-1 includes the service base interface for the subscriber migrations and include Network resources 1667-1 of the NF repository function (NRF) 1660-1, the Network Selector Function (NSSF) 1662-1, the Network Exposure Function (NEF) 1665-1; and the policy management functions of the BSF 1640-1, the Policy Control Function (PCF) 1644-1. The NSSF 1662-1 registers and discovers various available resources using standards-based application programming interfaces (APIs) using Service Proxy Communications (SCP) 1620-1. The NEF 1660-1 enables select capabilities to third-party services, including translation between internal and external representations for data, and could be implemented by an "API Server" in a microservices-based system. The NSSF 1662-1 enables a selection of a Network Slice to serve a given UE; network slices are essentially a way to partition network resources to differentiate services given to different users. The PCF 1644-1 manages the policy rules that other CP functions then enforce.

The (new) 5G core implements the complementary set of the above described 5G legacy network function (i.e., the migration is between the 5G NFs of a legacy/old vendor to the 5G NFs of a new vendor) which are migrated using the migration system 1627 which can instruct the orchestrator 1625 in the steps as described in FIGS. 1-15. The 5G core includes a set of functional blocks of the user plane network functions (UPNFs) 1635-2, and Control Plane Network Functions (CPNFs) 1630-2 of the 5G service-based architecture. The UPNF 1635-2 includes the User plane function (UPF) 1637-2, and includes a security edge protection proxy (SEPP) function 1641-2. Other user plane network functions can include data network (DN) functions. The CPNFs 1630-2 includes the service base interface for the subscriber migrations and include Network resources 1667-2 of the NF repository function (NRF) 1660-2, the Network Selector Function (NSSF) 1662-2, the Network Exposure Function (NEF) 1665-2; and the policy management functions of the BSF 1640-2, the Policy Control Function (PCF) 1644-2. The NSSF 1662-2 registers and discovers various available resources using standards-based application programming interfaces (APIs) using service proxy communications (SCP) 1620-2. The NEF 1660-2 enables select capabilities to third-party services, including translation between internal and external representations for data, and could be implemented by an "API Server" in a microservices-based system. The NSSF 1662-2 enables a selection of a Network Slice in the 5G domain to serve a given UE 1610-1, 1610-2, 1610-3, etc. The network slices are essentially a way to partition network resources to differentiate services given to different users. The PCF 1644-2 manages the policy rules that other CP functions then enforce.

The core components of both the legacy 5G and new 5G network (i.e., components between the 5G slices) include other functions (not required for subscriber migration) such as in the control plane of Packet control of the AMF (Core Access and Mobility Management Function) and the SMF (Session Management Function) that can receive session and connection information. The AMF is responsible for connection and reachability management, mobility management, access authentication and authorization, and location services. The SMF manages each UE session, including IP address allocation, selection of associated user plane function (UPF), control aspects of QoS, and control aspects of UP routing. The subscriber management includes the UDM (Unified Data Management) and AUSF (Authentication Server Function) 174 for generating authenticating vectors, user identification handling, network function registration, and retrieval of UE subscription data. The UDM manages user identity, including the generation of authentication credentials. The AUSF is essentially an authentication server.

In embodiments, in the user plane, the user plane function (UPF) forwards traffic between RAN and the access networks 1607. In addition to packet forwarding, it is responsible for policy enforcement, lawful intercept, traffic usage reporting, and QoS policing. The network slice components (i.e., the cellular network 1600) and the cloud-based cellular elements 1605 support the communication service of a particular connection type with a specific way of handling the Control Plane (CP) and User Plane (UP) for each service (legacy 5G or (new) 5G). To this end, a Network slice namely "5G slice" is composed of a collection of 5G network functions and specific Radio Access Technology (RAT) settings that are combined for the specific use case or business model. Thus, a 5G slice can span all domains of the network, software modules running on cloud nodes, specific configurations of the transport network supporting the flexible location of functions, a dedicated radio configuration or even a specific RAT, as well as the configuration of the legacy 5G/new 5G device. Third-party entities such as the access networks 1607 can be permitted to control certain aspects of slicing via a suitable Application Programmable Interface (API) to provide tailored service.

In an exemplary embodiment, the vRan or O-RAN (i.e., cellular network) can be implemented in part in a virtual plane and can include the components virtualized of DUs, CUs, and other 5G core network functions configured locally on a third-party hosted server or in separate servers as desired. The network function and services can be compartmentalized using a container orchestration platform like KURBENETES® which allows for instantiation by the orchestrator in the virtual plane prior to deployment.

The orchestrator 1625 monitors the network components and implements various software processes, algorithms executed by various computer hardware (resources), and determine the number of network functions and services that should be deployed to meet service level agreements (SLAs) across each network slice of the cellular network. In an exemplary embodiment, the orchestrator 1625 can instantiate new cloud components (i.e., migrated by the migration system 1627 in the virtual plane) and can perform a pipeline of calls and requests associated with the DU code and corresponding configuration files. The orchestrator 1625 can also be responsible for creating the containerized KUBERNETES® pods and activating other support functions. While orchestrator 1625 may initiate new code in branch with an associated container, the drift monitoring system is responsible for introducing imaged containers of DU 1625-1, 1625-2, CU 1623, and other functions to enable the migration of the network function in the cloud-based cellular system prior to deployment in the physical infrastructure.

In embodiments, the migration management tool or controller (of the migration system 1627) enables the slice control functionalities that exist in the Service Instance Layer as a functional block within the OSS/BSS that is responsible for interacting with the NFV Management and Orchestration systems to control slicing. The migration management tool receives Service Order Management that is imposed by the customer/business side for assigning services to network slices and for managing the lifecycle of these slices and the second function is responsible for mapping such network slices to NFV Network Services. The migration management tool is a processing block with capabilities as a slice Controller with slice management functions that request instantiation of the NS to NFV Management and Orchestration (NFV-MANO). Such slice management functions configure the VNFs and PNFs that make up the NS and thus the network slice.

In embodiments, the Service instance layer represents the end-user or enterprise services supported by the network. Each service is represented by a single service instance. In general, services are provided by network operators or third parties. The Network slice instance (Network Function layer) provides the network characteristics required by the service instance. A single network slice instance can be shared by multiple service instances. The network slice instance is composed of none, one or more sub-network instances shared by other network slice instances. The sub-network instance (network function and network operation) is a set of network functions, which run on the physical or logical/virtual Resources layer.

It should be noted that the general systems, structures, and techniques described above may be inter-combined, enhanced, modified, and/or otherwise implemented to provide any number of different features. In particular, the term "exemplary" is used herein to represent one example, instance, or illustration that may have any number of alternates. Any implementation described herein as "exemplary" should not necessarily be construed as preferred or advantageous over other implementations.

For the sake of brevity, conventional techniques related to broadcasting, streaming, networking, wireless communications, content distribution or delivery, communications standards or protocols, encoding/decoding standards or protocols, content formats, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments, the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

The invention claimed is:

1. A system to migrate a set of network functions between control planes of network slices, comprising:
    a control plane of a network slice A that comprises a first set of a plurality of network functions;
    a control plane of a network slice B; and
    a migration management unit configured to manage a gradual staged transfer of the plurality of network functions originally contained in the control plane of the network slice A to the control plane of network slice B, wherein the gradual staged transfer is a migration of the plurality of network functions in a set of multiple staged transfers, wherein:
        each staged transfer comprises the migration of a reduced subset of the plurality of network functions contained in the control plane of the network slice A reconfigured to the control plane of the network slice B;
        a pre-migration configuration of network slice A comprises the plurality of network functions mapped to the control plane of network slice A wherein the network slice A comprises a set of a plurality of User Equipment (UE) profiles; and
        the plurality of UE profiles are updated with the network slice B only after a first staged transfer of the set of multiple staged transfers and prior to a last staged transfer of the set of multiple staged transfers.

2. The system of claim 1, further comprising:
    the migration management unit configured to enable each staged transfer of network functions by a mapping of the reduced subset of the plurality of network functions contained in the control plane of the network slice A to the control plane of the network slice B.

3. The system of claim 1, further comprising:
    the migration management unit configured to enable each staged transfer of the plurality of network functions by a seamless migration of the plurality of network functions in the control plane of the network slice A to the control plane of the network slice B without interruption of operation of a connected user equipment.

4. The system of claim 1, wherein:
the plurality of User Equipment (UE) profiles are updated with the network slice B after the first staged transfer of network functions comprising Policy and Control Functions (PCFs) and Binding Support Functions (BSFs).

5. The system of claim 1, further comprising:
the migration management unit configured to onboard and instantiate the subset of the plurality of network functions in the control plane of the network slice B from the control plane of the network slice A without impeding operations of the plurality of network functions received by a connected user equipment.

6. The system of claim 1, further comprising:
the migration management unit configured to enable the migration of the plurality of network functions via a priority scheme wherein a first user equipment of a set of premium users is given higher prioritized access to the control plane of the network slice B than a second user equipment of a set of non-premium users.

7. The system of claim 4, further comprising:
wherein the set of the plurality of network functions is a limited network function set that at least comprises Policy and Control Functions (PCFs), Binding Support Functions (BSFs), Network Exposure Functions (NEFs), Network Slice Selection Functions (NSSFs), Service Communications Proxy (SCP), and Security Edge Protection Proxy (SEPP).

8. The system of claim 1, further comprising:
in response to each staged transfer of the subset of the plurality of network functions, the migration management unit is configured to locate part of the subset of the plurality of network functions in the control plane of the network slice B while the plurality of network functions is operationally maintained on the network slice A until completion of the staged transfer of the subset of the plurality of network functions to the network slice B.

9. The system of claim 8, further comprising:
the migration management unit configured to terminate functionalities of the plurality of network functions contained in the network slice A upon completion of the gradual staged transfer of the plurality of network functions.

10. A method for a gradual migration of network functions between network slices, comprising:
associating, by a migration management unit, a first set of a plurality of network functions in a control plane of a network slice A;
determining, by the migration management unit, a control plane of a network slice B; and
managing, by the migration management unit, a gradual staged transfer of the plurality of network functions that are originally contained in the control plane of the network slice A to the control plane of network slice B, wherein the gradual staged transfer comprises a migration of the plurality of network functions in a set of multiple staged transfers, wherein:
each staged transfer comprises the migration of a reduced subset of the plurality of network functions contained in the control plane of the network slice A reconfigured to the control plane of the network slice B;
a pre-migration configuration of network slice A comprises the plurality of network functions mapped to the control plane of network slice A wherein the network slice A comprises a set of a plurality of User Equipment (UE) profiles; and
the migration management unit updates the plurality of UE profiles with the network slice B only after a first staged transfer of the set of multiple staged transfers and prior to a last staged transfer of the set of multiple staged transfers.

11. The method of claim 10, wherein the gradual staged transfer comprises:
mapping, by the migration management unit, each reduced set of the plurality of network functions contained in the control plane of the network slice A to the control plane of the network slice B.

12. The method of claim 10, further comprising:
managing, by the migration management unit, the gradual staged transfer without interruption of communication of a connected user equipment.

13. The method of claim 12, wherein:
the set of UE profiles are updated by the migration management unit with the network slice B after the first staged transfer of network functions comprising Policy and Control Functions (PCFs) and Binding Support Functions (BSFs).

14. The method of claim 10, further comprising:
onboarding and instantiating, by the migration management unit, each reduced set of the plurality of network functions migrated to the control plane of the network slice B from the control plane of the network slice A without interfering with operations of a connected user equipment.

15. The method of claim 10, further comprising:
prioritizing, by the migration management unit, the plurality of network functions in a priority sequence of reduced sets of the plurality of network functions that are to be transferred between network slice A and network slice B, wherein policy and charging control functions (PCFs) and Binding Support Functions (BSFs) are prioritized higher than a remainder of the plurality of network functions that are to be transferred.

16. The method of claim 10, further comprising:
wherein the plurality of network functions at least comprises Policy and Control Functions (PCFs), Binding Support Functions (BSFs), Network Exposure Functions (NEFs), Network Slice Selection Functions (NSSFs), Service Communications Proxy (SCP), and Security Edge Protection Proxy (SEPP).

17. The method of claim 10, further comprising:
in response to each staged transfer of the subset of the plurality of network functions, the migration management unit is configured to locate part of the subset of the plurality of network functions in the control plane of the network slice B while the plurality of network functions is operationally maintained on the network slice A until completion of the staged transfer of the subset of the plurality of network functions to the network slice B.

18. A computer program product tangibly embodied in a non-transitory computer-readable storage device that stores a set of instructions that when executed by a processor perform a method to migrate a set of network functions between control planes of network slices, the method comprising:

determining, by the processor, a first set of a plurality of network functions in a control plane of a network slice A;

determining, by the processor, a control plane of a network slice B; and managing, by the processor, a gradual staged transfer of the plurality of network functions that are originally contained in the control plane of the network slice A to the control plane of network slice B, wherein the gradual staged transfer comprises a migration of the plurality of network functions in a set of multiple staged transfers, wherein:

each staged transfer comprises the migration of a reduced subset of the plurality of network functions contained in the control plane of the network slice A reconfigured to the control plane of the network slice B;

a pre-migration configuration of network slice A comprises the plurality of network functions mapped to the control plane of network slice A wherein the network slice A comprises a set of a plurality of User Equipment (UE) profiles; and the processor updates the plurality of UE profiles with the network slice B only after a first staged transfer of the set of multiple staged transfers and prior to a last staged transfer of the set of multiple staged transfers.

19. The computer program product of claim 18, wherein the gradual staged transfer comprises:

mapping, by the processor, each reduced set of the plurality of network functions contained in the control plane of the network slice A to the control plane of the network slice B.

20. The computer program product of claim 18, wherein:

the plurality of User Equipment (UE) profiles are updated with the network slice B after the first staged transfer of network functions comprising Policy and Control Functions (PCFs) and Binding Support Functions (BSFs).

\* \* \* \* \*